US 8,527,878 B2

(12) United States Patent
Drewes et al.

(10) Patent No.: US 8,527,878 B2
(45) Date of Patent: Sep. 3, 2013

(54) COMPUTER PROGRAM AND METHODS FOR AUTOMATICALLY INITIALIZING AN AUDIO CONTROLLER

(75) Inventors: Thomas M. Drewes, Atlanta, GA (US); James S. Joiner, Avondale Estates, GA (US); Michael A. Pocino, Marietta, GA (US); Craig H. Richardson, Marietta, GA (US)

(73) Assignee: Polycom, Inc., San Jose, CA (US)

( * ) Notice: Subject to any disclaimer, the term of this patent is extended or adjusted under 35 U.S.C. 154(b) by 49 days.

(21) Appl. No.: 13/230,247

(22) Filed: Sep. 12, 2011

(65) Prior Publication Data
US 2011/0320942 A1 Dec. 29, 2011

Related U.S. Application Data

(60) Division of application No. 12/436,846, filed on May 7, 2009, now Pat. No. 8,234,573, which is a continuation of application No. 10/644,670, filed on Aug. 20, 2003, now Pat. No. 7,552,389.

(51) Int. Cl.
*G06F 3/00* (2006.01)

(52) U.S. Cl.
USPC ........... 715/716; 715/717; 715/719; 715/722; 715/727; 715/728; 370/260; 370/261; 370/262; 370/270

(58) Field of Classification Search
USPC ................ 715/716, 717, 719, 722, 727, 728; 370/260–262, 270
See application file for complete search history.

(56) References Cited

U.S. PATENT DOCUMENTS

| 5,390,138 | A |   | 2/1995  | Milne et al.              |
|-----------|---|---|---------|---------------------------|
| 5,619,555 | A | * | 4/1997  | Fenton et al. ... 379/88.11 |
| 5,687,334 | A |   | 11/1997 | Davis et al.              |
| 5,922,047 | A | * | 7/1999  | Newlin et al. ... 709/217 |
| 5,966,532 | A |   | 10/1999 | McDonald et al.           |
| 6,275,805 | B1 | * | 8/2001 | Fado et al. ... 704/270   |
| 6,421,692 | B1 |   | 7/2002 | Milne et al.              |
| 6,772,436 | B1 | * | 8/2004 | Doganata et al. ... 725/106 |
| 7,350,156 | B2 |   | 3/2008 | Kohyama et al.            |
| 7,864,209 | B2 | * | 1/2011 | Jeong et al. ... 348/14.08 |
| 8,060,225 | B2 | * | 11/2011 | Hans et al. ... 700/94   |
| 2004/0260416 | A1 |  | 12/2004 | Kellom et al.            |

OTHER PUBLICATIONS

Polycom, Inc., Conference Composer User Guide, as downloaded on Aug. 8, 2003 from http://www.polycom.com/common/pw_item_show_doc/0,1449,735,00.pdf.

* cited by examiner

*Primary Examiner* — Tadeese Hailu
(74) *Attorney, Agent, or Firm* — Wong, Cabello, Lutsch, Rutherford & Brucculeri, L.L.P.

(57) ABSTRACT

A computer program of the type commonly known as a "wizard" is disclosed that initializes user interface software for controlling an audio conferencing device. The wizard allows the desired audio inputs (e.g., microphone, telephones, etc.) and audio outputs (speakers, recording devices, etc.) to be chosen by an audio system administrator. Thereafter, the wizard allows an audio conferencing device (or devices) to be chosen by the administrator, or allows such a device(s) to be optimally chosen dependent upon the chosen inputs and outputs. The wizard then maps the inputs and outputs to the input and output ports on the audio conferencing device. When the administrator finishes the wizard, the wizard computes the mapping parameters and other audio-optimizing parameters for the selected inputs and outputs. These parameters are then loaded into the user interface software automatically.

19 Claims, 21 Drawing Sheets

COMPUTER PROGRAM AND METHODS FOR AUTOMATICALLY INITIALIZING AN AUDIO CONTROLLER

CROSS REFERENCE TO RELATED APPLICATIONS

This application is a divisional application of U.S. patent application Ser. No. 12/436,846 which in turn is a continuation of U.S. patent application Ser. No. 10/644,670, filed Aug. 20, 2003 to which priority is claimed and each of which are hereby incorporated by reference in their entirety.

FIELD OF THE INVENTION

The present invention relates generally to software for an audio conferencing system, and more particularly to a computer program for initializing a computerized user interface for controlling an audio conference controller device.

BACKGROUND

Audio conferencing devices 10a, shown in simplified form in FIG. 1, allow potentially large numbers of conference participants to communicate with each other through a variety of different audio media. Such devices are usefully deployed in a single room, requiring only a single device, such as 10a, or in larger room which may require an additional device, such as 10b, connected by a link 15. Alternatively, the audio conferencing devices 10a and 10b can be located in remote locations. Examples of audio conference systems 10a include those manufactured by Polycom, Inc., including their Vortex® line of products, which may be deployed in environments such as schools, churches, corporate board rooms, court rooms, etc.

A typical audio conferencing device 10a is able to handle a variety of different audio (or audio/video) input devices, such as microphones 12, or stereo deck 14, which has a left and right channel. Similarly, the audio conferencing device 10a is coupleable to numerous different potential audio (or audio/video) output devices, such as mono speaker 22, stereo speakers 20 (having left and right channels), or audio recorder 24. Some audio devices may also have audio input/output capability, such as telephone 16. Other audio devices can be coupled to the audio conference device 10a, as one skilled in the art understands, and the foregoing devices audio input/output devices are merely illustrative.

Generally speaking, the audio conferencing device 10a processes the incoming audio signals from the audio input devices to generate output audio signals that are broadcast through the output audio devices and into the intended environment. Such processing might include, for example, implementation of echo and noise cancellation routines. However, at a more basic level, the audio conferencing device is also used to connect, or "map," the audio inputs to the outputs, and to appropriately optimize the signals in accordance with the inputs and outputs being used. Both of these mapping and optimization functions are performed by the controller 26 within the device 10a.

Mapping describes the manner in which the controller 26 couples the inputs to the outputs. In this regard, sophisticated audio conferencing devices like the Vortex® can flexibly route audio signals from various input ports to various output ports. As such devices typically have several input and output ports, mapping informs the system administrator how to connect the various input and output devices to the system.

As noted above, the controller 26 also preferably allows for signal optimization appropriate for the input and output devices that are coupled to it. In a simple signal optimization example, if a mono microphone input is to be broadcast to stereo speakers, the controller adjusts the gain sent to each channel (left and right) of the stereo speaker by −3 dB, so that each speaker's volume is decreased to compensate for the two channels of audio output. In another example, suppose a particular type of speaker is chosen which has a relatively low bass output. Knowing this, the system can be adjusted to boost the gain on the bass (low frequencies) to better improve the audio being broadcast from that speaker. Other input devices might be particularly noisy, requiring more intensive noise reduction or filtering schemes.

Such optimization and mapping can be accomplished by the use of user interface software running on a personal computer 28 (or similar device having like functionality), which couples to the controller 26, and which can be used by an audio system administrator to perform the mapping and optimization functions described above. User interface software is well known in the audio conferencing art, and for example, includes the Conference Composer™ software package that accompanies the Vortex® product line. The reader's familiarity with Conference Composer is assumed, and therefore it is only briefly described. (Further details concerning the operation and structure of Conference Composer can be found in Polycom Inc.'s Conference Composer User's Guide, which can be downloaded via the internet from www.polycom.com. A copy of this user guide is filed with the parent application Ser. No. 10/644,670, filed Aug. 20, 2003 and it is hereby incorporated by reference. Basically, Conference Composer is a Microsoft Windows™ program, and when run on computer 28 displays, in typical Windows fashion, various options that the system administrator can adjust to achieve the mapping and optimization functions described earlier. Exemplary screen shots from Conference Composer are shown in FIGS. 10A-10G.

Conference Composer can be daunting to operate for even an experienced system administrator. As a review of FIGS. 10A-10G shows, Conference Composer provides many different options to the system administrator, each reflected in tab-selectable screens (System (FIG. 10A), Options, Mic/Line Inputs (FIG. 10B), Dialer, Input Filters (FIG. 10C), AutoMixer (FIG. 10D), EF bus, Matrix Mixer (FIG. 10E), Output Filters (FIG. 10F), Outputs (FIG. 10G), Logic Input, Logic Output, Presets, Macros, and Diagnostics). Each of these screens in turn provides different sub-options that the administrator can choose or adjust. For example, FIG. 10E shows the "Matrix Mixer," which shows how the various input and output devices are mapped, and in which each entry in the matrix sets forth the gain amplification from a particular input to a particular output. These gain values can be adjusted by the system administrator to achieve desired sound in the environment in which the audio conferencing system is placed. Other screens provide similar audio processing options, each with its own attendant complexities for the administrator.

While providing the system administrator with much flexibility to optimize and map, perform other administrative functions, and otherwise tailor the audio conferencing environment as desired, Conference Composer, or other similar software packages, can be complicated to operate, especially for the system administrator who is using the software or the system for the first time. In general, such administrators simply want the audio conferencing system to work "right out of the box," without substantial learning or system adjustments on their part. In short, they generally want to know where they should connect the input and output devices, to make these connections, and then to turn the system on and have the system otherwise configure itself as appropriate, leaving the administrator to merely adjust or "tweak" system parameters rather than having to adjust system options manually from scratch, and tab by tab (or screen by screen). This disclosure provides such a solution.

SUMMARY OF THE DISCLOSURE

A computer program of the type commonly known as a "wizard" is disclosed that initializes user interface software for controlling an audio conferencing device. The wizard allows the desired audio inputs (e.g., microphone, telephones, etc.) and audio outputs (speakers, recording devices, etc.) to be chosen by an audio system administrator. Thereafter, the wizard allows an audio conferencing device (or devices) to be chosen by the administrator, or allows such a device(s) to be optimally chosen dependent upon the chosen inputs and outputs. The wizard then maps the inputs and outputs to the input and output ports on the audio conferencing device, a step which again can be performed manually by the administrator or automatically by the wizard. After reviewing the mapping results, the administrator finishes the wizard, which computes the mapping parameters and other audio-optimizing parameters for the selected inputs and outputs. These parameters are then loaded into the user interface software, which saves the administrator the time and inconvenience of having to set up and optimize these parameters from scratch.

BRIEF DESCRIPTION OF THE DRAWINGS

The inventive concepts disclosed herein will be best understood with reference to a detailed description of specific embodiments, which follows, when read in conjunction with the accompanying drawings, in which.

DETAILED DESCRIPTION

In the interest of clarity, not all features of actual implementations of a computer program and methods for automatically initializing an audio controller are described in the disclosure that follows. It should be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that the development of a computer program and methods for automatically initializing an audio controller would nevertheless be a routine undertaking for those of skill in the art given the details provided by this disclosure.

To assist the system administrator in initializing the user interface software, such as the Conference Composer software summarized earlier, this disclosure provides a user friendly set-up program, of the type known in the software art as a "wizard." Using the wizard, the system administrator can define the input and output devices to be used with his audio conferencing device, and the wizard program automatically maps and optimizes the system parameters for optimized performance. Thereafter, the mapping details and optimized system parameters are loaded into the user interface program to initialize the audio conferencing device. Accordingly, the administrator need only "tweak" the audio system parameters loaded into the initialized user interface software to tailor the audio performance to the environment in question, and need not start off changing settings in the interface software from scratch, tab by tab (or screen by screen). Moreover, the administrator is informed how to connect the various input and output device to the various input/output ports on the audio conferencing device according to the map generated by the wizard.

In reality, the disclosed wizard program is more closely akin to a subroutine or subprogram that runs in the user interface software when that software is first executed, although it could also constitute a completely separate program. Reference to the wizard as a "program" herein should be understood to include all of these concepts.

The wizard program will be described herein from a functional standpoint. In an actual implementation, one skilled in the art will realize that computer coding will be necessary to implement the wizard program and to appropriately interface it with the user interface program and/or the audio conferencing device. However, such procedures, and how to code for them, are well known in the art, and can be accomplished in a number of different ways. In any event, because such coding details are a routine matter for one skilled in the art, the specific coding details are not described herein.

Figure 2:
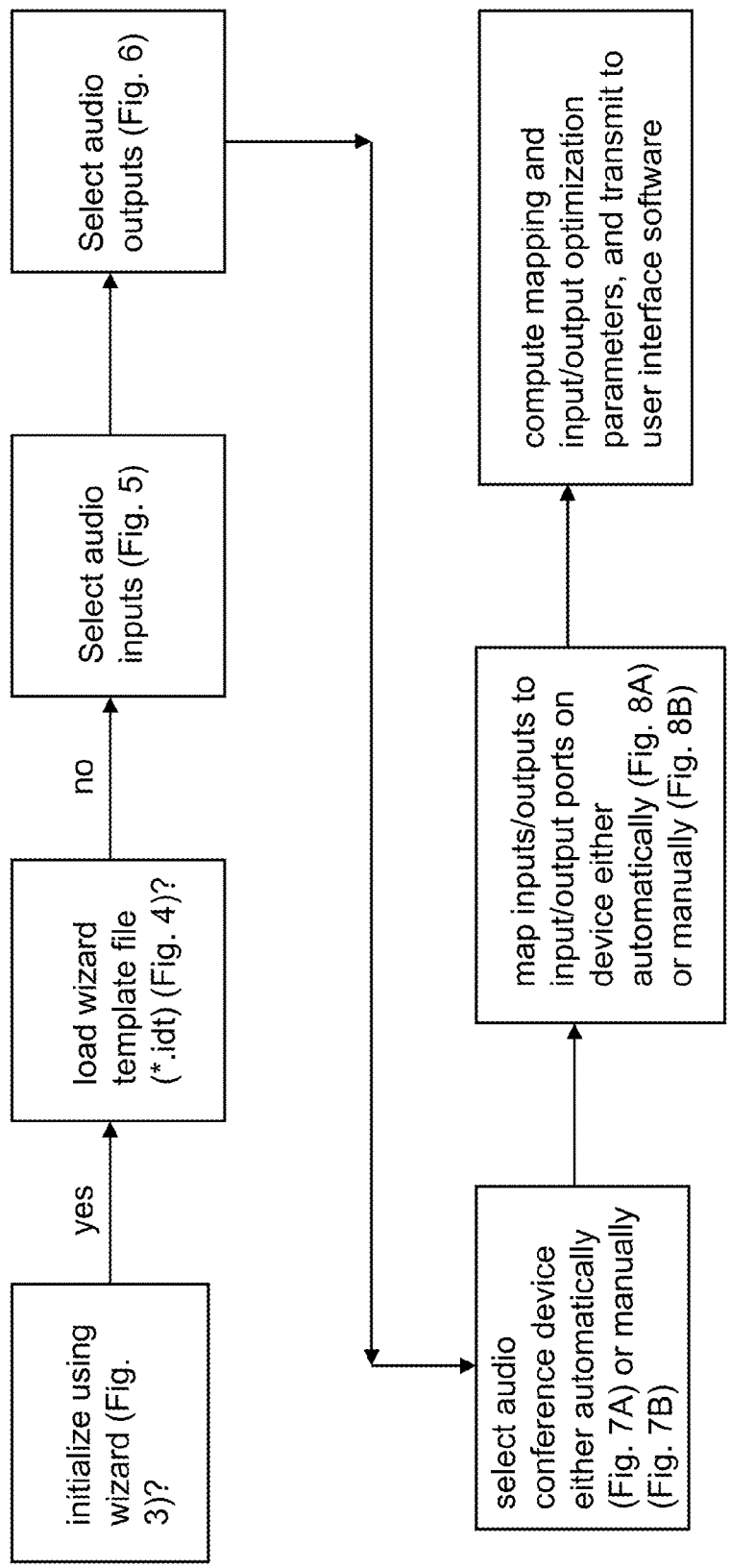
FIG. 2 shows a flow diagram of the operation of the disclosed wizard program.
Figure 3:
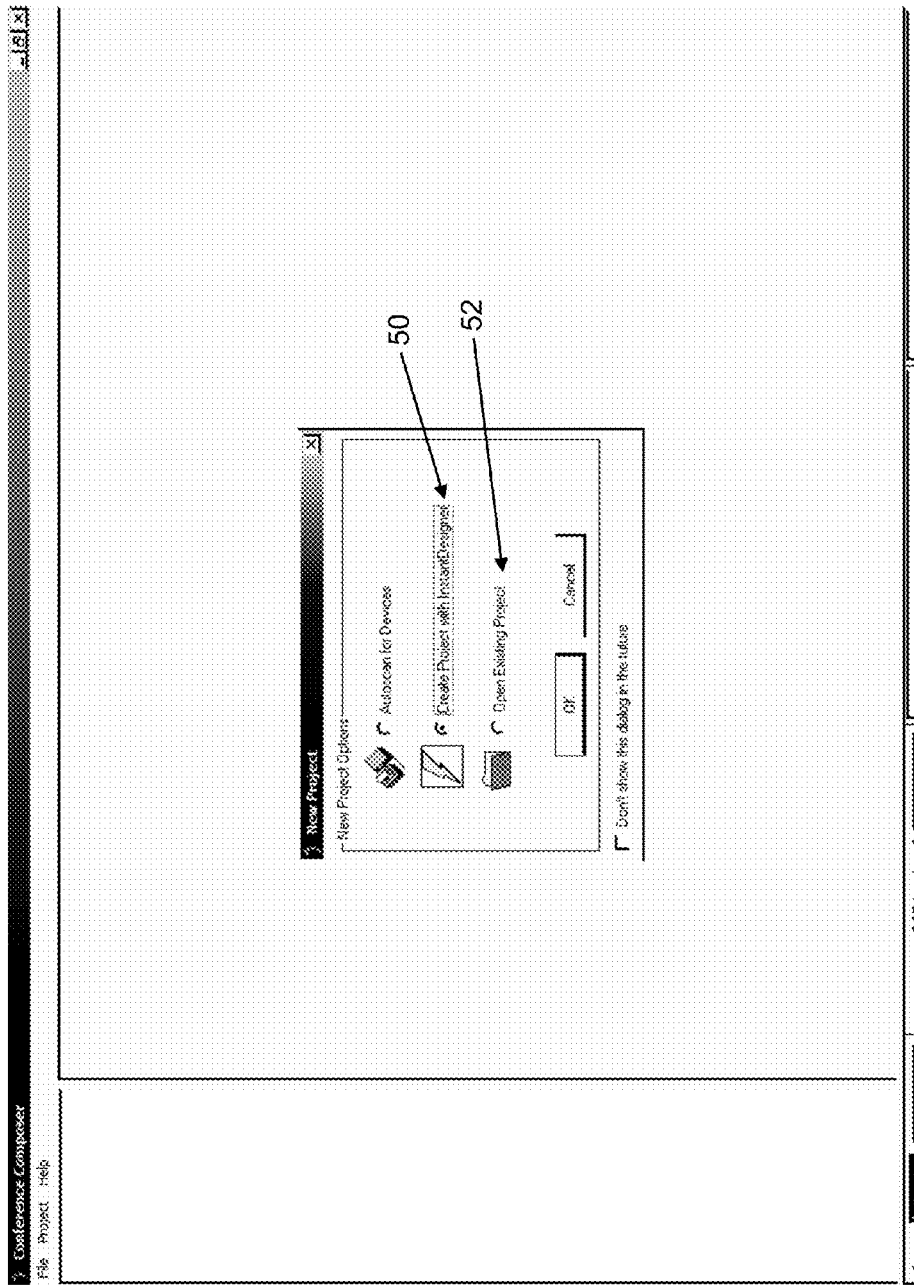
FIG. 3 shows the introductory screen for the user interface software, which allows the audio system administrator to choose the wizard program to initialize the user interface software.

FIG. 2 shows the basic logical flow of the wizard program (Polycom's InstantDesigner™) which will be discussed in tandem with the screen shots of the wizard program which appear in FIGS. 3-9. When Conference Composer is first executed, the administrator is presented with the screen of FIG. 3, which provides an option 50 to initiate the wizard program. Additionally, FIG. 3 provides an option 52 to allow the administrator to load in a previously saved Conference Composer project file (*.ccp) for the user interface software which contains the mapping and optimization parameters already used for the environment in question. This allows the administrator to bypass the wizard and to proceed directly to the user interface software, into which the mapping and optimization parameters from the *.ccp file are loaded. However, assume the wizard option 50 is chosen is chosen, as would normally be the case if the audio conferencing equipment is being initialized for use in a new environment or with new input or output devices.

Figure 4:
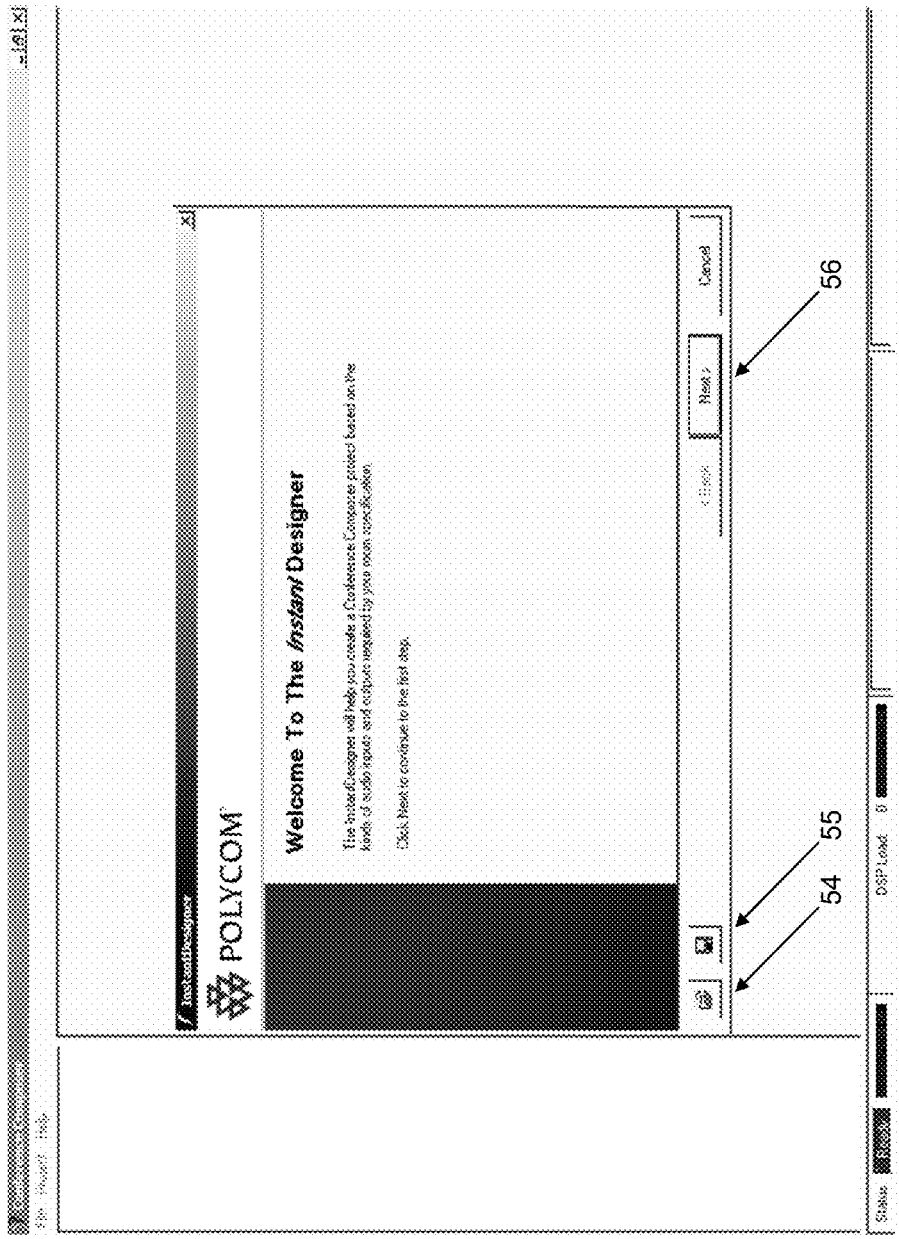
FIG. 4 shows the introductory screen for the wizard, and the ability to save and load wizard files.

The program passes the administrator to the wizard's introductory screen in FIG. 4. FIG. 4 (and the subsequent wizard screens of FIGS. 5-9) allow the system administrator to open 54 or save 55 a wizard file (i.e., an InstantDesigner file, *.idt) which the administrator might have used to previously initialize the system, and which is used to ultimately generate a *.ccp file for the user interface. However, assume that the administrator decides to run the wizard from scratch to make a new *.idt file, and thus chooses option 56 to go the next screen in the wizard.

Figure 5:
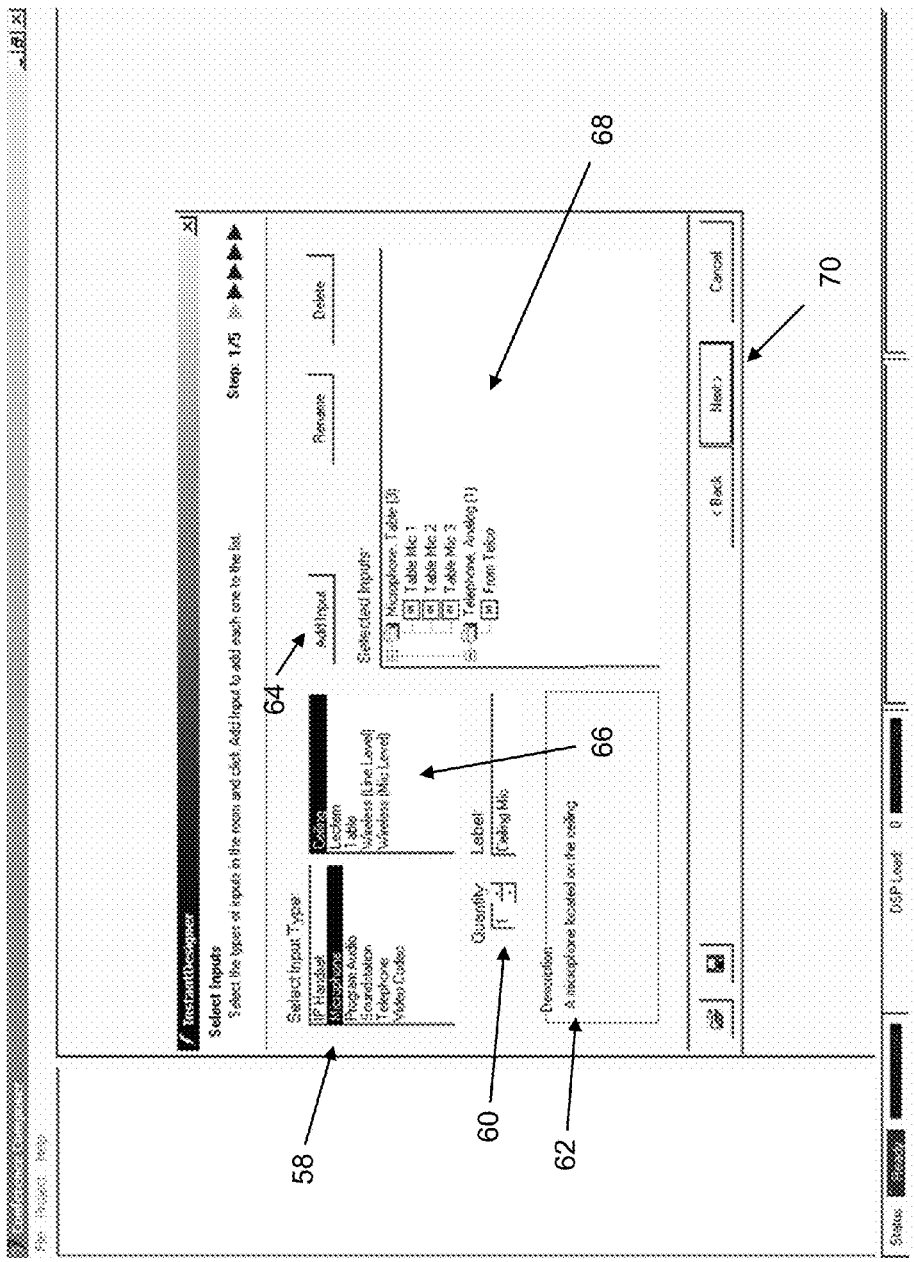
FIG. 5 shows the first page of the wizard, which allows for the selection of audio input devices to be used in the system.

The wizard passes the administrator to the first wizard screen of FIG. 5, which allows the administrator to inform the wizard of the audio input devices that are to be used in the audio conferencing system. Specifically, the input type groups are displayed in window 58, and specific devices falling within the group are displayed in window 66. For example, and as shown, the microphone group 58 contains various microphones, such ceiling microphones, table microphones, etc. To add extra clarity for the administrator, the input devices are summarized in window 62 when highlighted using the cursor. The administrator selects the specific inputs to be used from window 66, and by pressing the add input button 64, causes the selected input to be displayed in selected input window 68. The number of desired inputs can be adjusted with the quantity window 60. The selected inputs can be deleted or renamed if needed using the buttons above the selected inputs window 68. In the example shown in FIG. 5, three table microphones and one analog telephone have been chosen by the administrator as inputs. Once the appropriate inputs and their quantity are chosen by the administrator, the administrator can choose the next button 70 to go to the next screen of the wizard.

Figure 6:
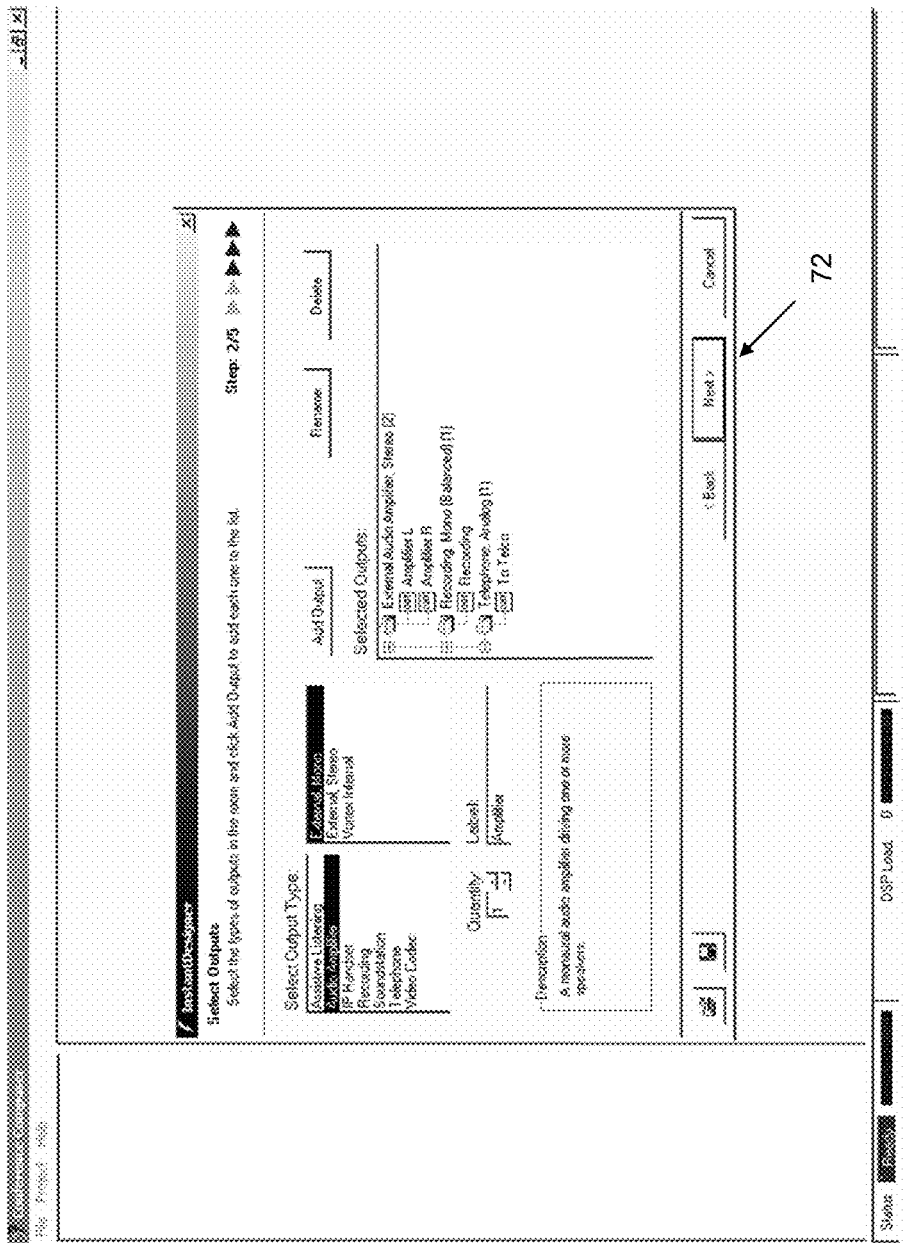
FIG. 6 shows the second page of the wizard, which allows for the selection of audio output devices to be used in the system.

The next (second) screen of the wizard, as shown in FIG. 6, allows the administrator to choose the output devices for the audio conferencing system (e.g., amplifiers, recording devices, etc.). This screen is structured and functions much like the first screen. In the example shown in FIG. 6, the administrator has chosen an external stereo amplifier (having left and right channels), and a monophonic (single channel) recording device. Note that previously chosen inputs are automatically displayed as selected outputs if they constitute input/output audio devices. This is the case for the telephone that was selected earlier. Once the outputs are chosen, the administrator can choose the next button 72 to go to the next screen of the wizard.

Figure 7A:
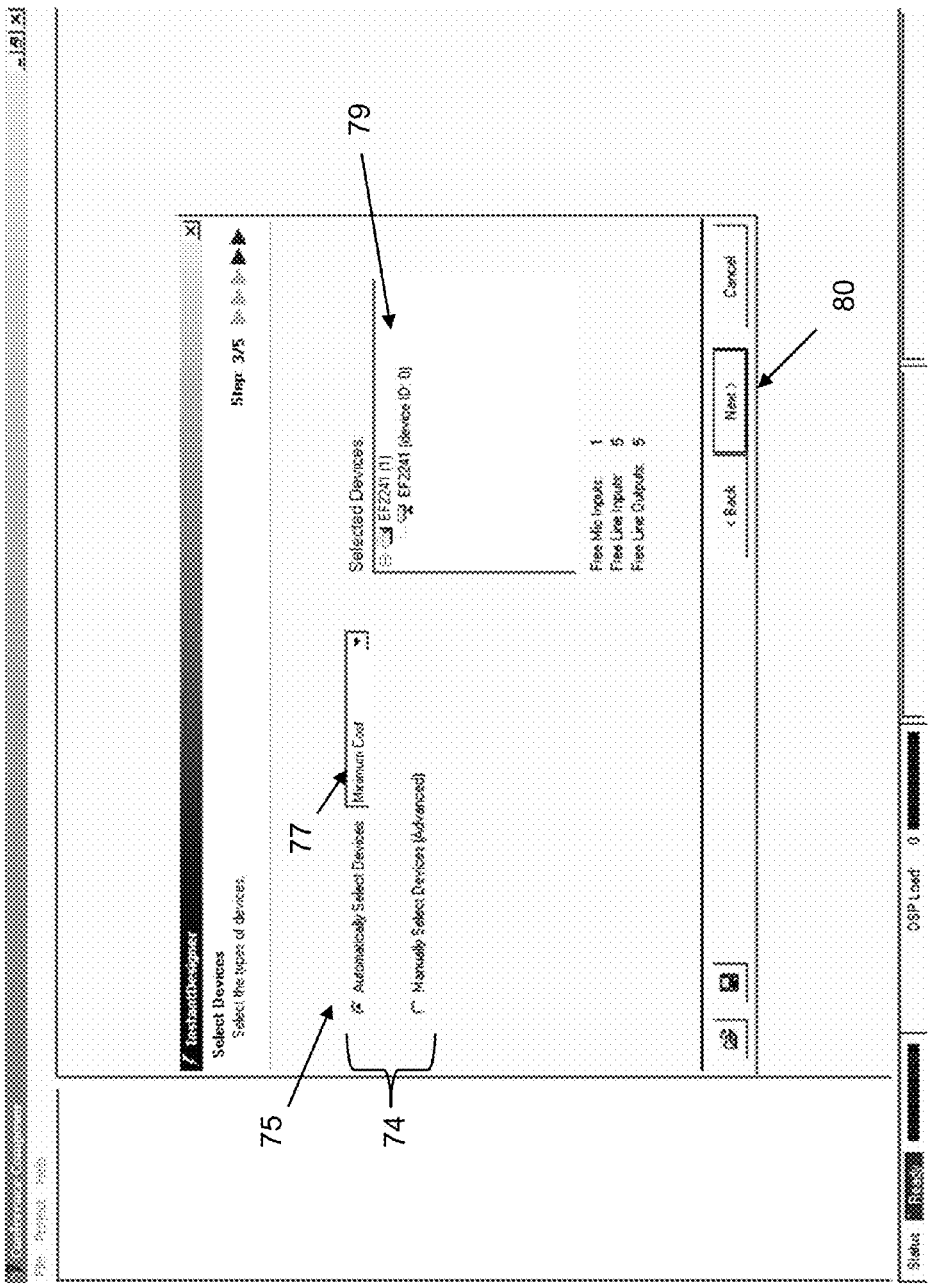
FIGS. 7A and 7B show the third page of the wizard, and respectively show automatic and manual selection of the audio conferencing device(s) to be used in the system.
Figure 7B:
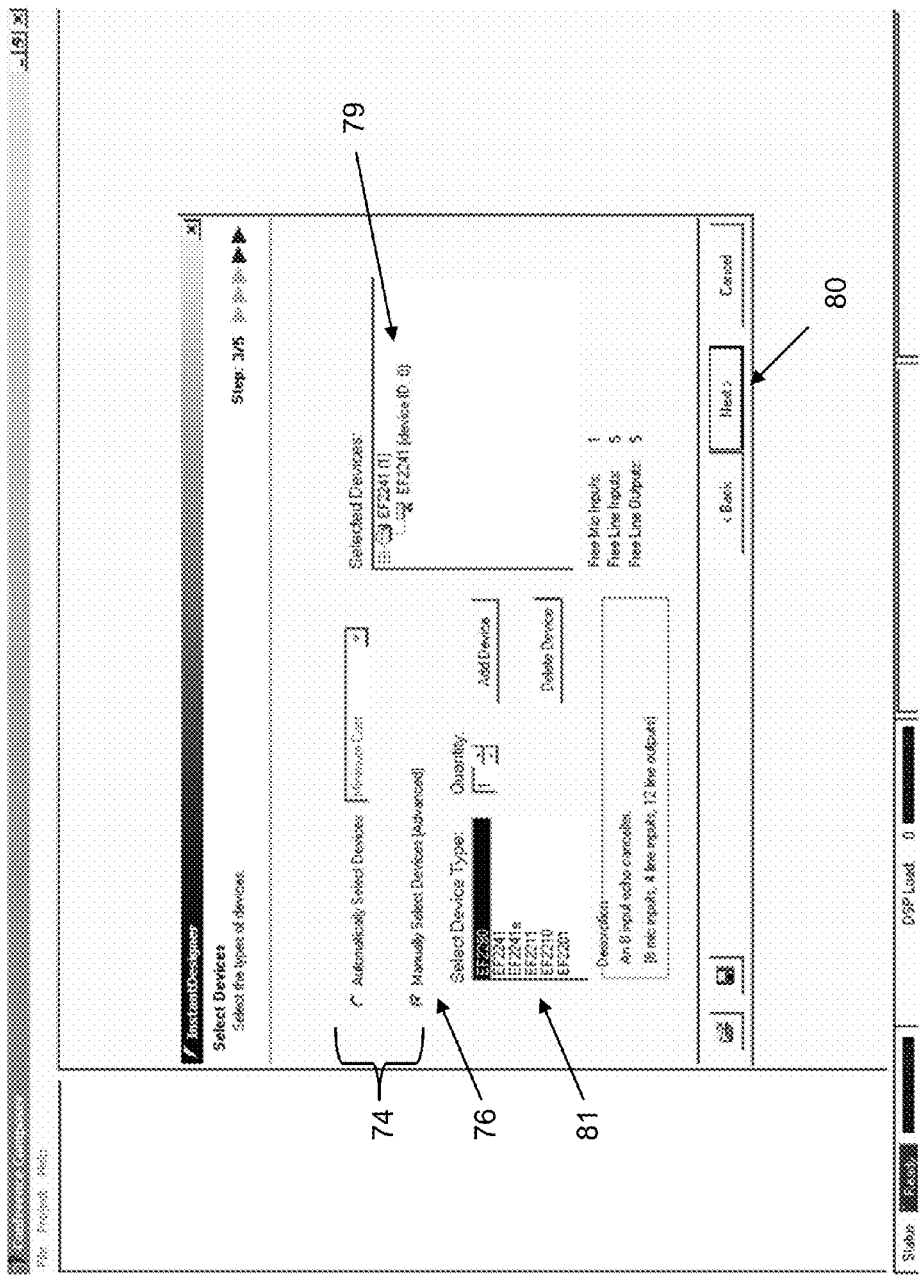
Figure 7C:
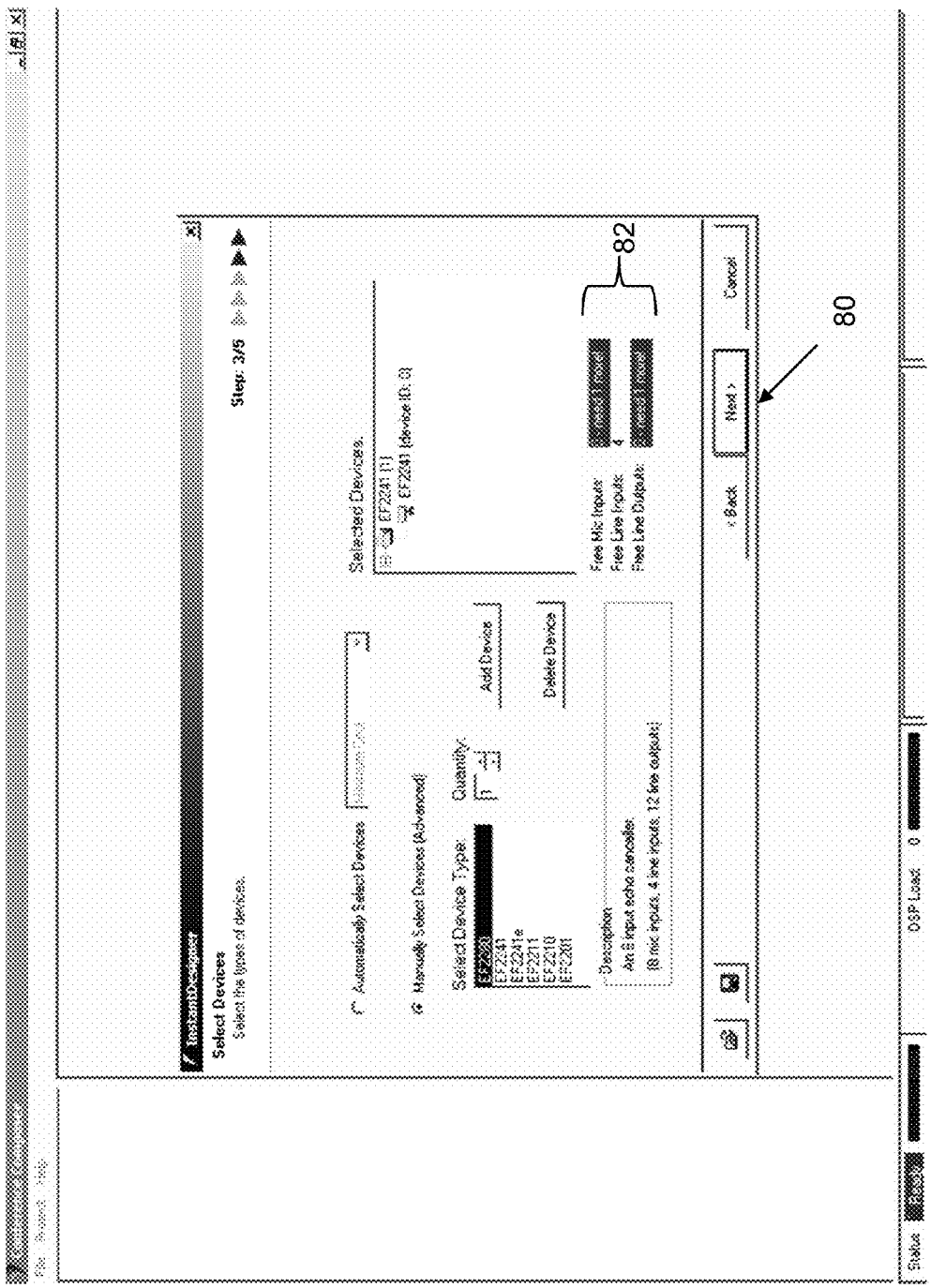
FIG. 7C shows a warning indicator indicating that the chosen audio conferencing device cannot support the previously chosen input or output devices.

The next (third) screen of the wizard is shown in FIGS. 7A and 7B. These screens allow the administrator to choose the audio conferencing device that will be used to map and process the specified audio inputs to the specified audio outputs. This third screen provides the administrator two main options, depicted at 74. The first option 75, shown in FIG. 7A, allows the administrator to have the wizard automatically select the optimal audio conferencing device that should be used. In this regard, the administrator is provided an option box 77 to choose the type of optimization that is desired, such as minimal cost or minimal rack space. In this regard, the wizard may very well, depending on the number of previously selected inputs and outputs, decide that a number of audio conferencing devices are optimal and should be coupled together to achieve the administrator's goals. In the example shown in FIG. 7A, the wizard has decided that one Vortex Model EF2241 would provide the minimal cost for the functionality that the administrator requires (i.e., one telephone, three table microphones, one stereo amplifier, and one mono recording unit), and has displayed this device in the selected devices box 79. Such automatic selection of the audio conferencing device can be valuable to the administrator, who can use such information, for example, to make decisions about purchasing additional equipment that might be needed to in accordance with projected audio conferencing demand. Thus, while the wizard is particularly useful to automatically perform the mapping and audio processing optimization functions disclosed herein, the wizard in this respect also constitutes a useful tool to help potential customers decide which audio conferencing device would be appropriate and optimal for their needs.

The second option 76, depicted in FIG. 7B, allows the administrator to specifically choose the audio conference device that is to be used. This, of course, would be the natural option for the administrator to choose if he lacks the flexibility to choose an audio conferencing device because one has already been purchased and must be utilized. Pursuant to this option, the administrator selects his device from select device type window 81. As with selection of the inputs and outputs, numerous types of devices can be chosen and more than one of each type can be chosen. Ultimately, the added devices are displayed in the selected devices box 79, and again in this example a Vortex Model EF2241 has been chosen. As an audio conferencing device is selected, the wizard makes an assessment of whether the selected device will be sufficient to provide the input/output capabilities that the administrator requires. For example, if the number of microphone inputs is increased from three to five (at FIG. 5), and the number of stereo amplifiers is increased from one to four (at FIG. 6), the wizard will display a warning to the administrator at region 82 (FIG. 7C), which informs the administrator of the number of free microphone inputs, line inputs, and line outputs that are still available. In this example, increasing the number of microphones and amplifiers has exhausted the number of inputs and outputs that the EF2241 device can handle, and accordingly the administrator is notified at region 82 that the EF2241 is one microphone input and one output line short for the administrator's application. At this point, the administrator could chose the first option 75 (FIG. 7A), to automatically compute what audio conferencing device(s) could solve his loading problem at minimum costs. Although not shown, were this option chosen, the administrator would be informed that one Vortex Model EF2201 and one Vortex Model EF2280 would be optimal for his application in lieu of the single EF2241.

Figure 1:
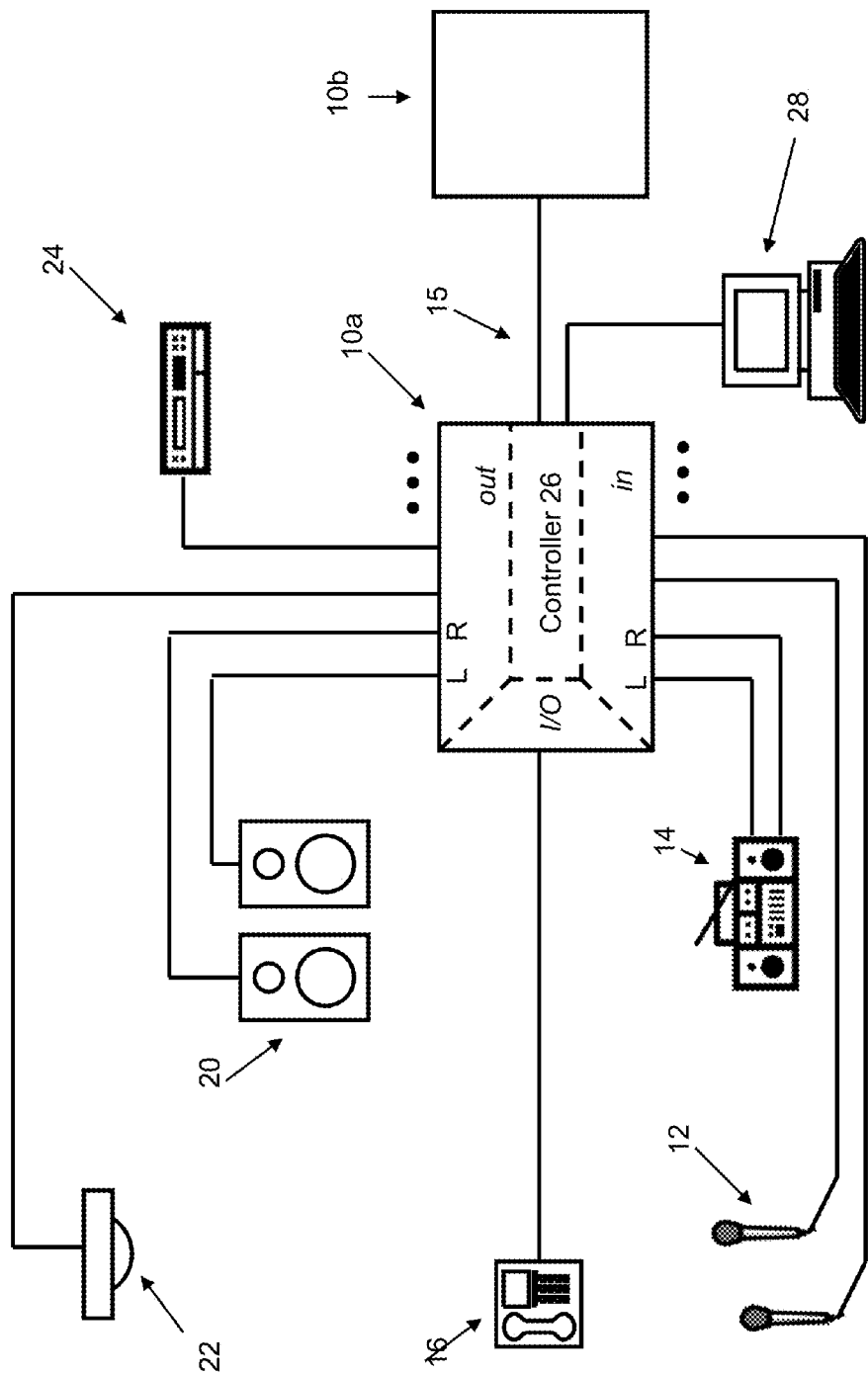
FIG. 1 shows a diagrammatic representation of an audio conferencing system and exemplary audio input and output devices.

Regardless of the audio conferencing device selection option chosen, one skilled in the art will understand that it is a relatively simple matter for the wizard to choose and assess the device in question, so long as information regarding the number of input/output ports present on the devices and their costs are known to the wizard program. When installed on a computer 28 (FIG. 1) with internet connectivity, such information (e.g., the cost of each of the devices or the addition of new devices and their capabilities and costs) can be periodically updated as it changes.

Figure 8A:
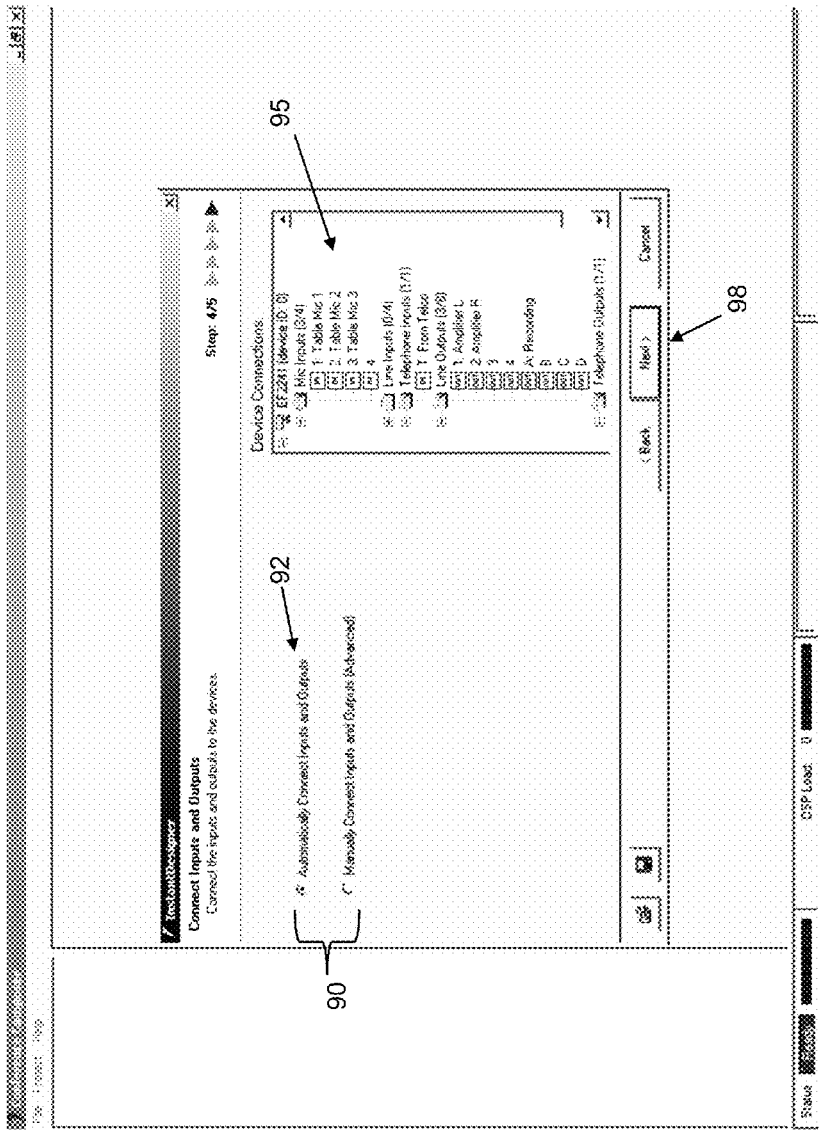
FIGS. 8A and 8B show the fourth page of the wizard, and respectively show automatic and manual mapping of the selected inputs and outputs to the input and output ports on the selected audio conference device(s).
Figure 8B:
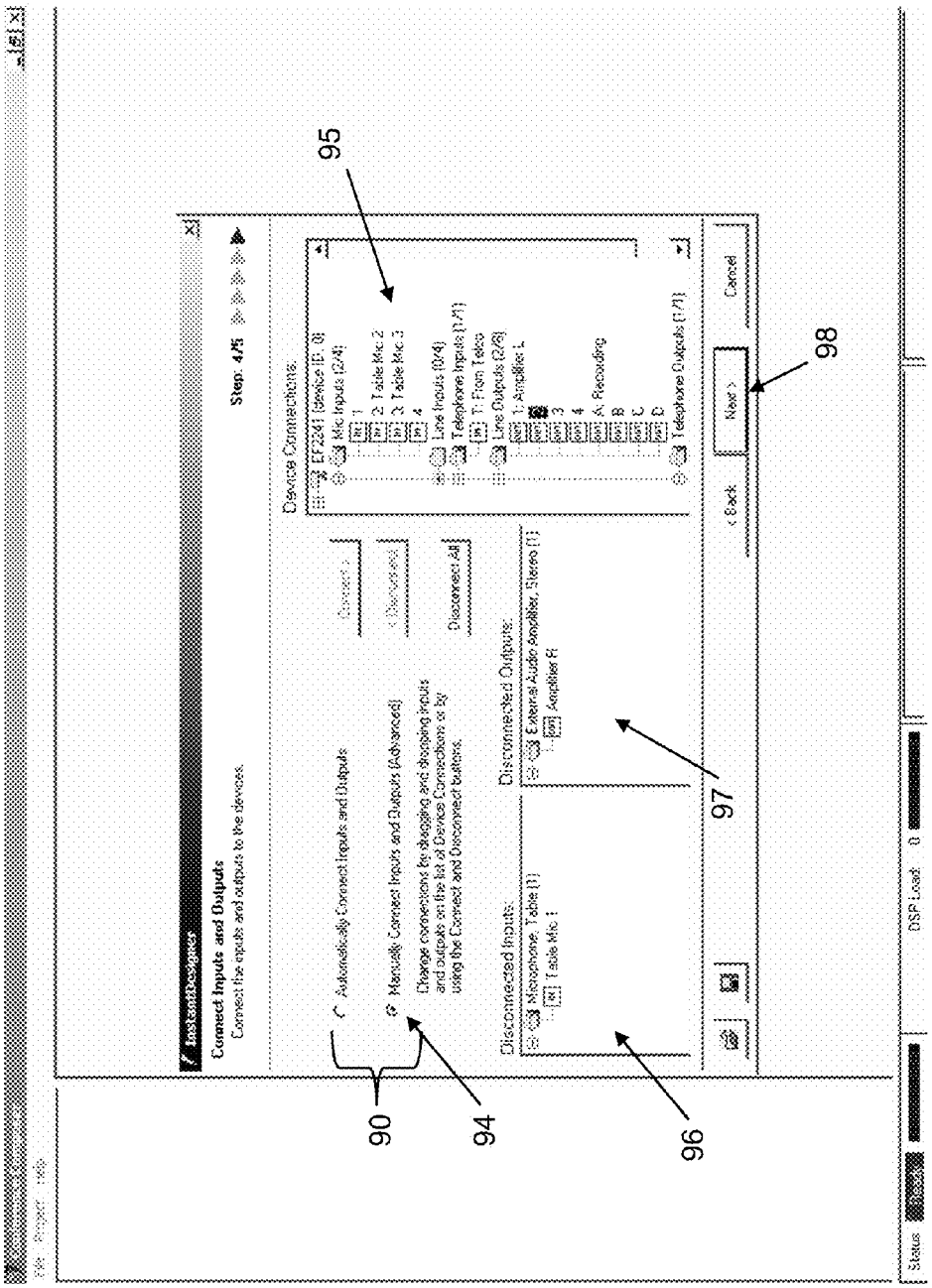
Figure 8C:
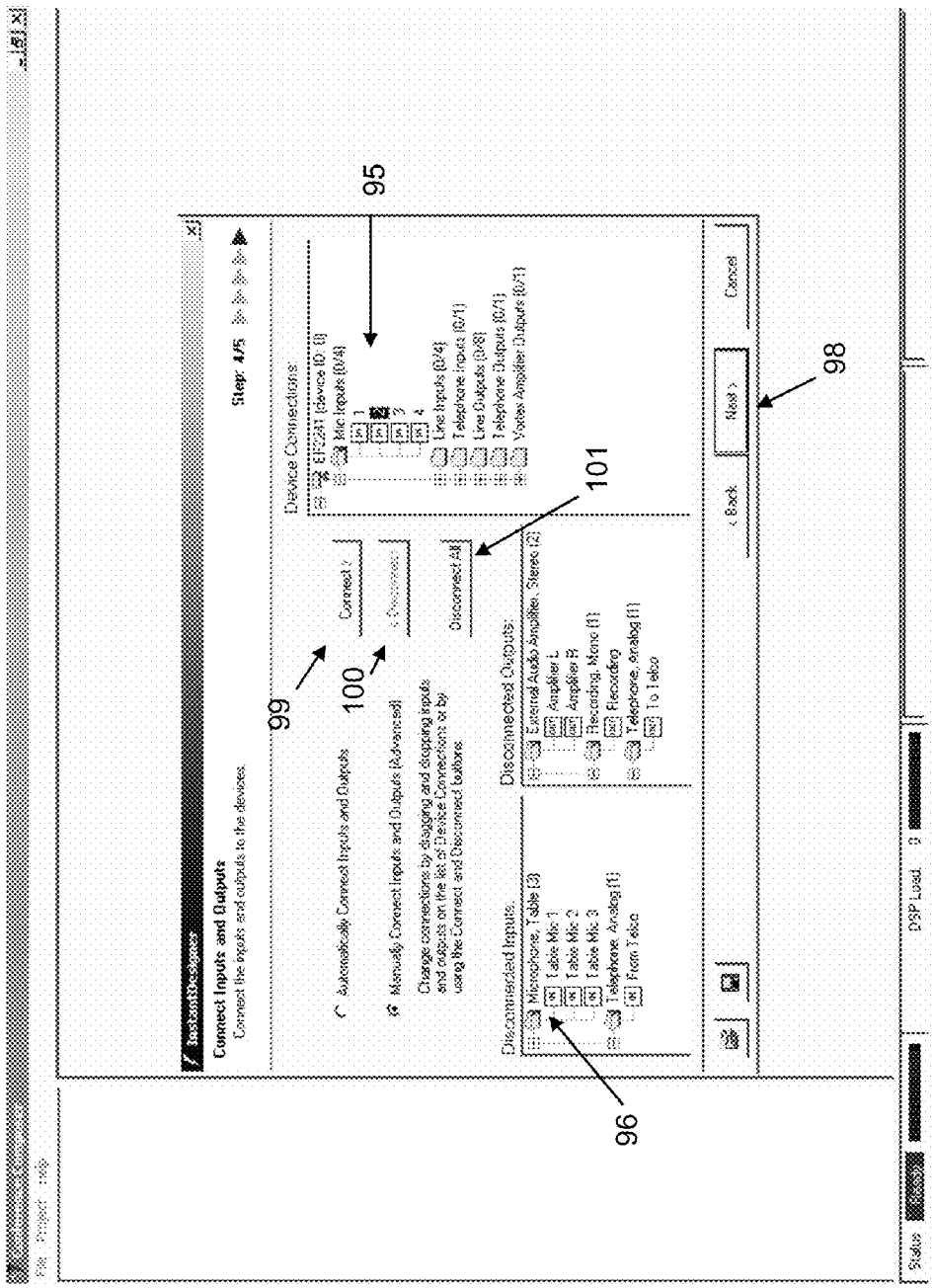
FIGS. 8C and 8D show with more specificity the manual process for mapping an input to a particular input port.

Regardless of the device selection option chosen, when the administrator is content with the selected audio conferencing device, he can select the next button 80 to proceed to the next (fourth) screen of the wizard, which is displayed in FIGS. 8A and 8B. (At this step, it is preferable upon selection of next button 80 for an error message to be displayed should the chosen device not provide suitable functionality, i.e., if a warning appears in region 82 as discussed above. This preferable feature, however, is not shown in the figures). This fourth wizard screen provides for mapping the selected inputs and outputs to appropriate input and output ports on the selected audio conferencing device(s). Like the preceding screen, this screen offers the administrator the option 90 to have the wizard automatically map 92 (FIG. 8A), or to allow the administrator to manually map 94 (FIG. 8B). If automatic mapping 92 is chosen, the previously chosen inputs and outputs will be mapped to specific input and output ports on the selected audio conference device, with such mapping being displayed in the mapping window 95. Thus we see in our example that the three microphone selected earlier are mapped to the first three microphone input ports on the EF2241 device, that there are no line connections to the device, that the one telephone input port is mapped to the selected telephone, that the right and left channels of the stereo amplifier are mapped to the first and second line output ports, that the recording device is connected to output line port A, and that the one telephone output port is mapped to the selected telephone. (Not visible from the mapping window 95 is that the one vortex amplifier output on the EF2241 device is not used, although this could be seen through activation of the slider bar associated with this window).

Figure 8D:
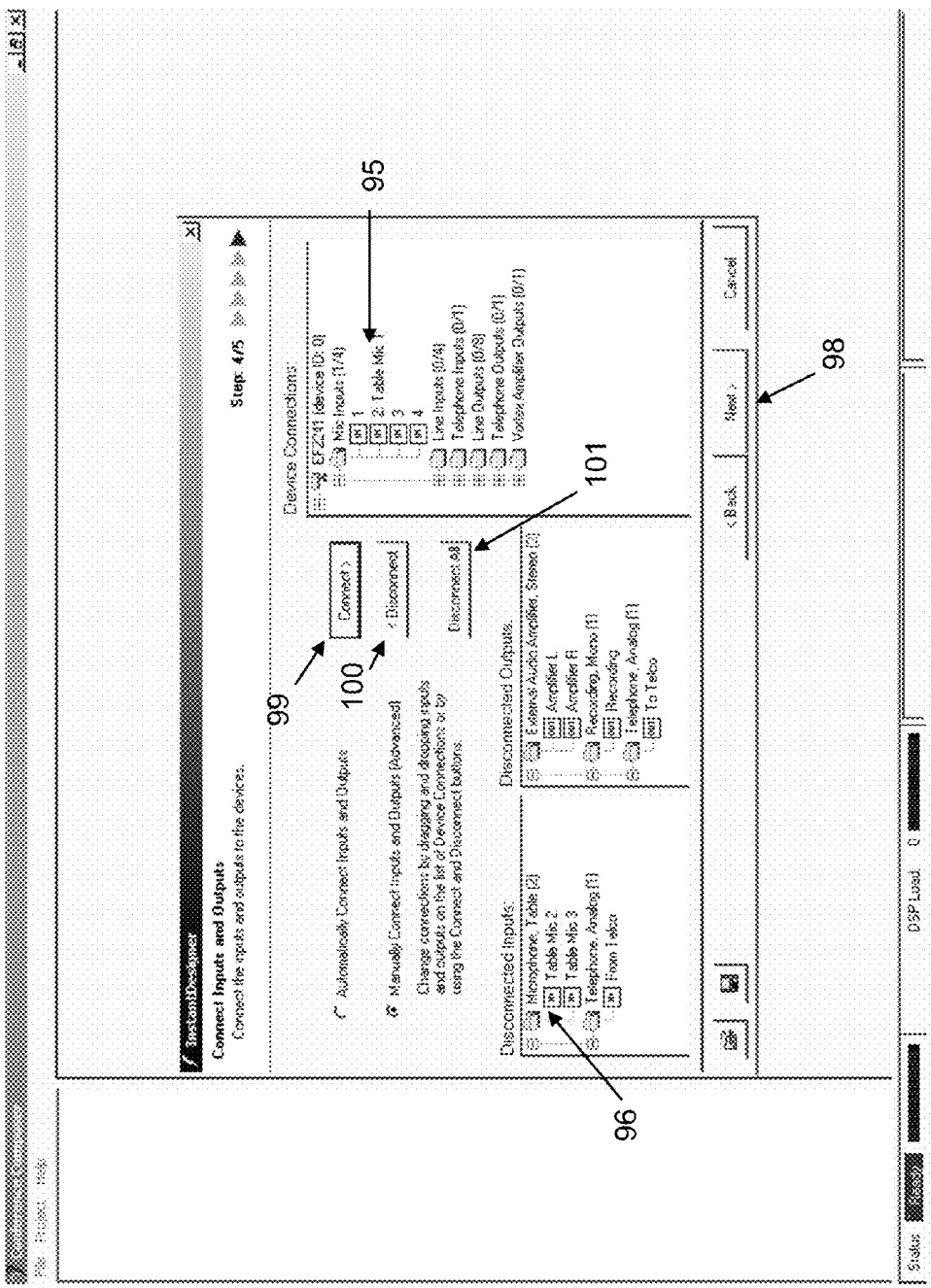
Figure 9:
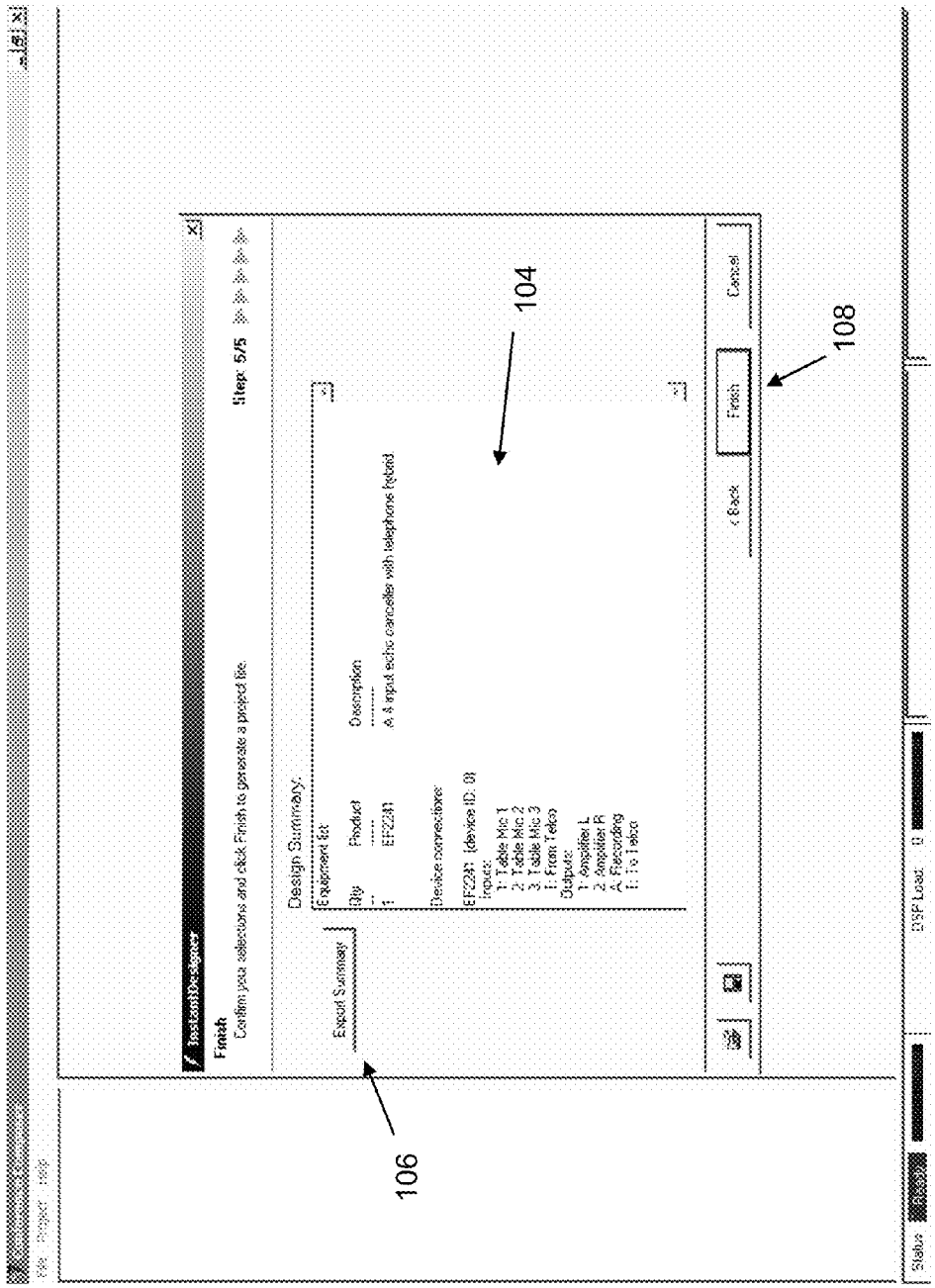
FIG. 9 shows the last page of the wizard, which includes the ability to review the mapping information, and to finish the wizard to calculate mapping and optimization parameters for transmission to the user interface software.
Figure 10A:
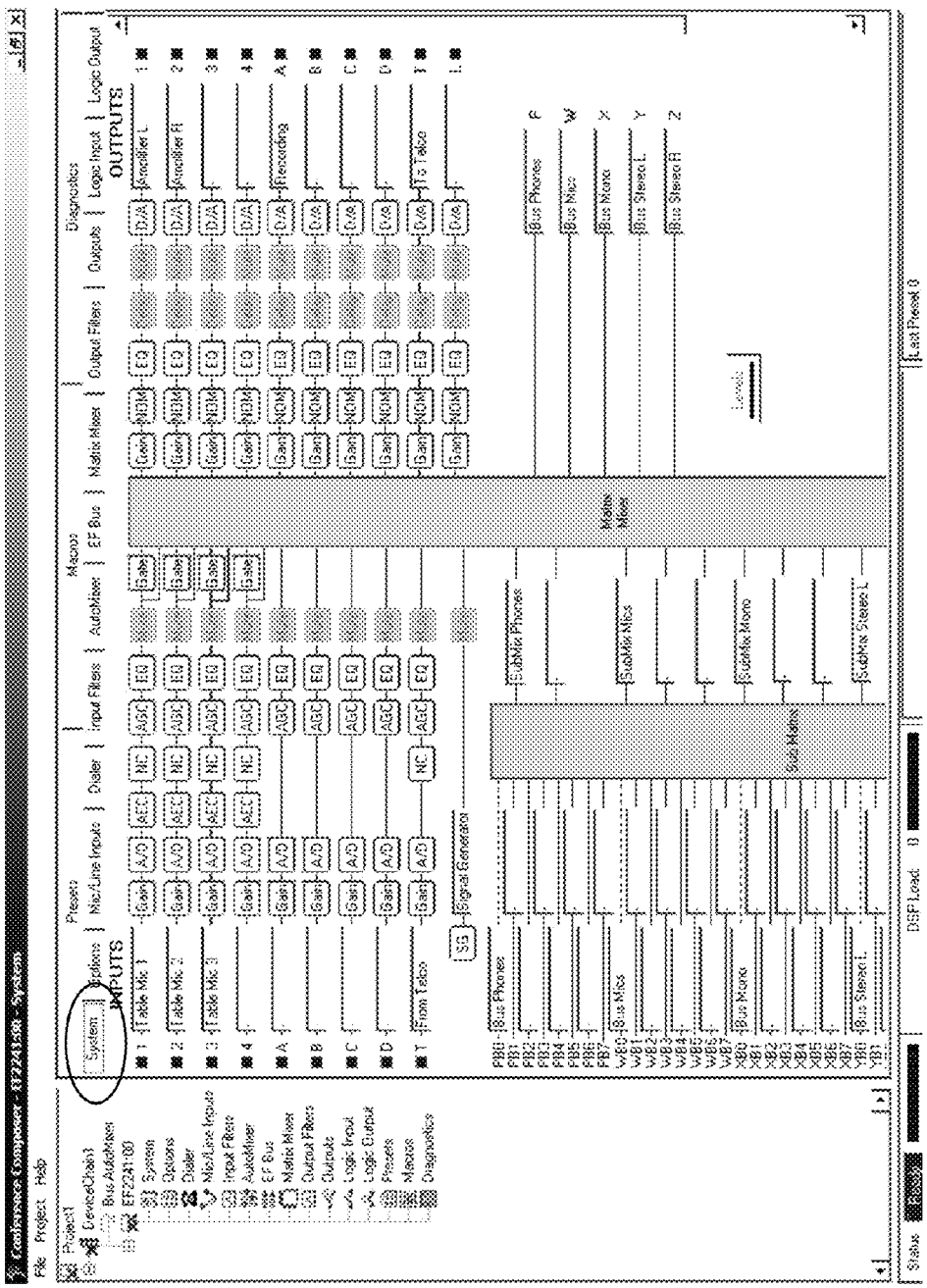
FIGS. 10A-10G show various screen in the user interface software after being initialized with the mapping and optimization parameters calculated by the wizard.
Figure 10B:
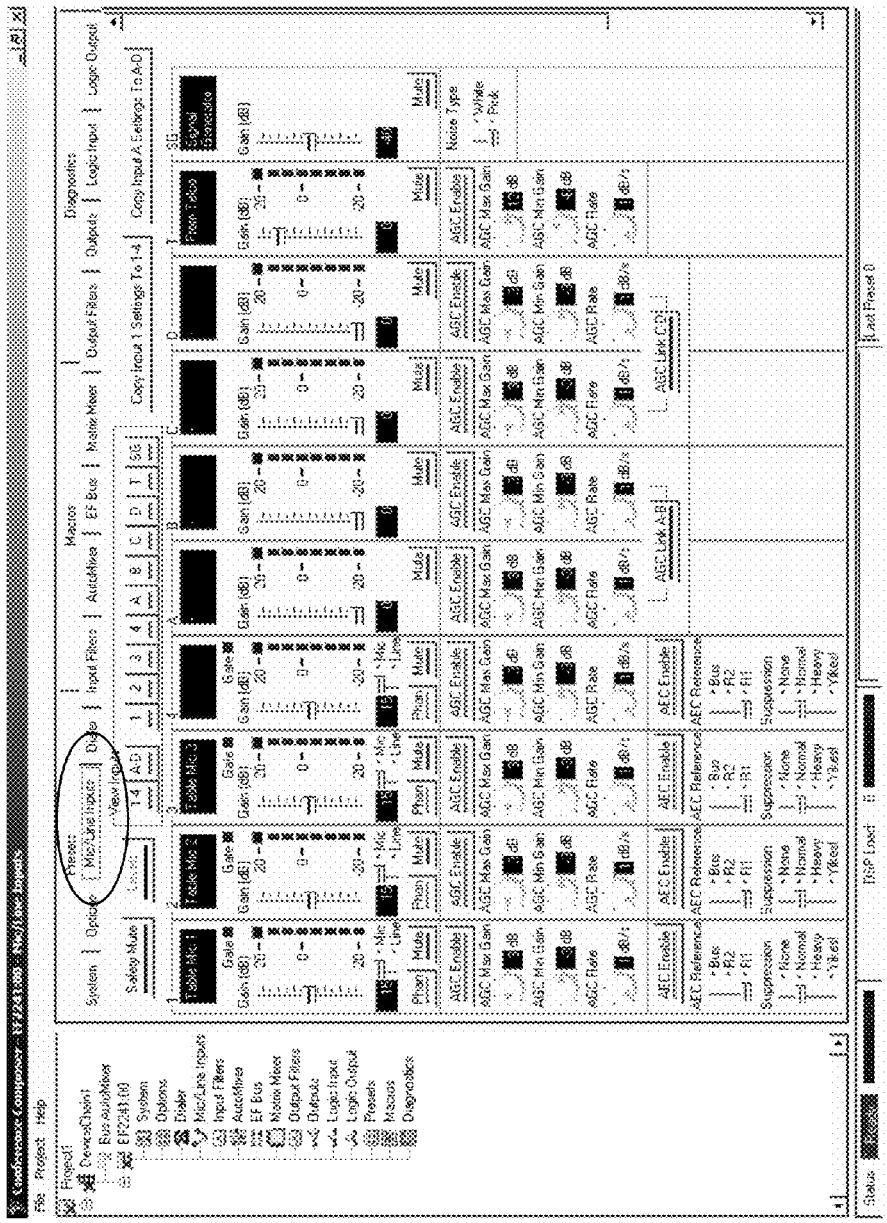
Figure 10C:
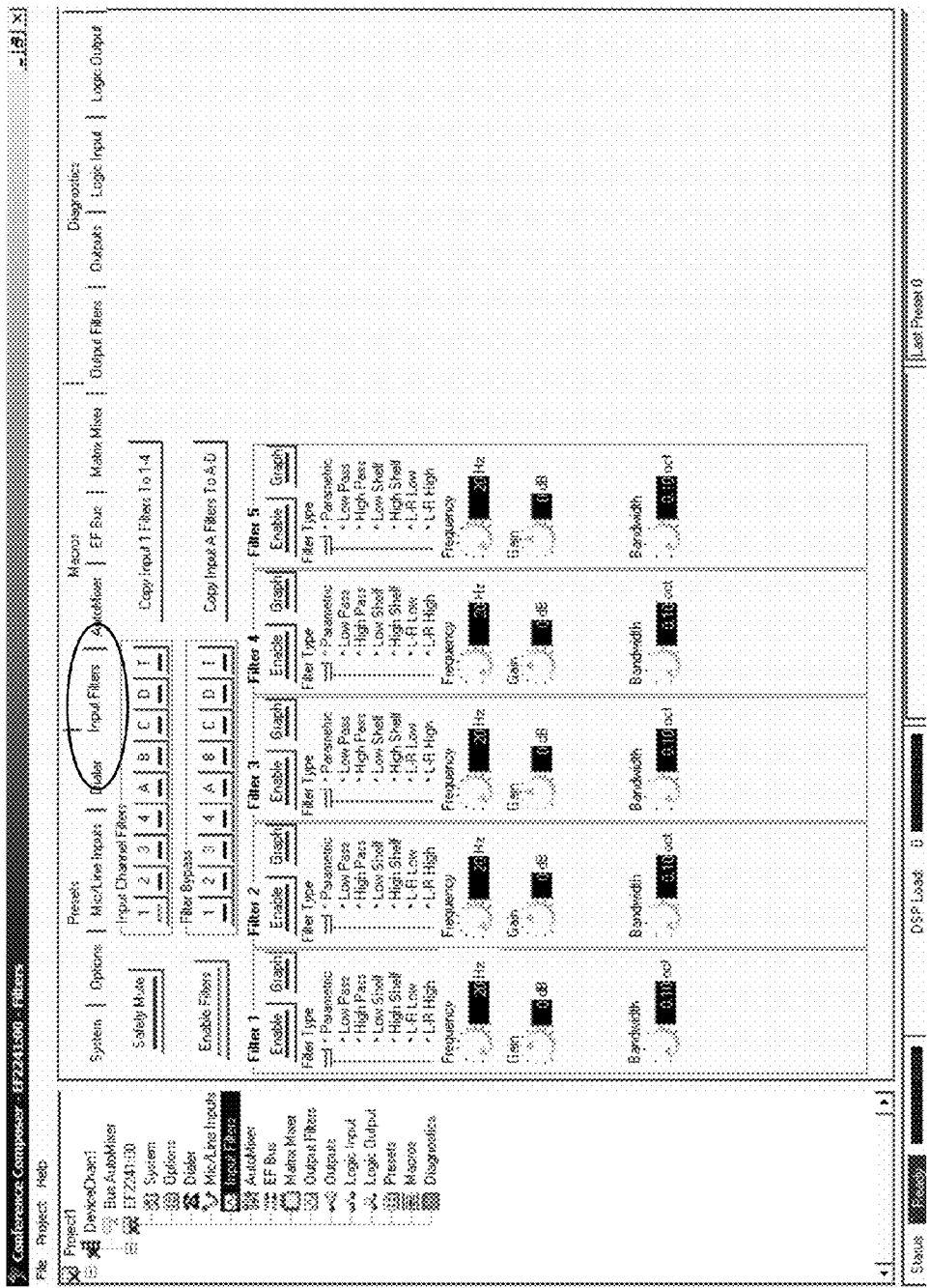
Figure 10D:
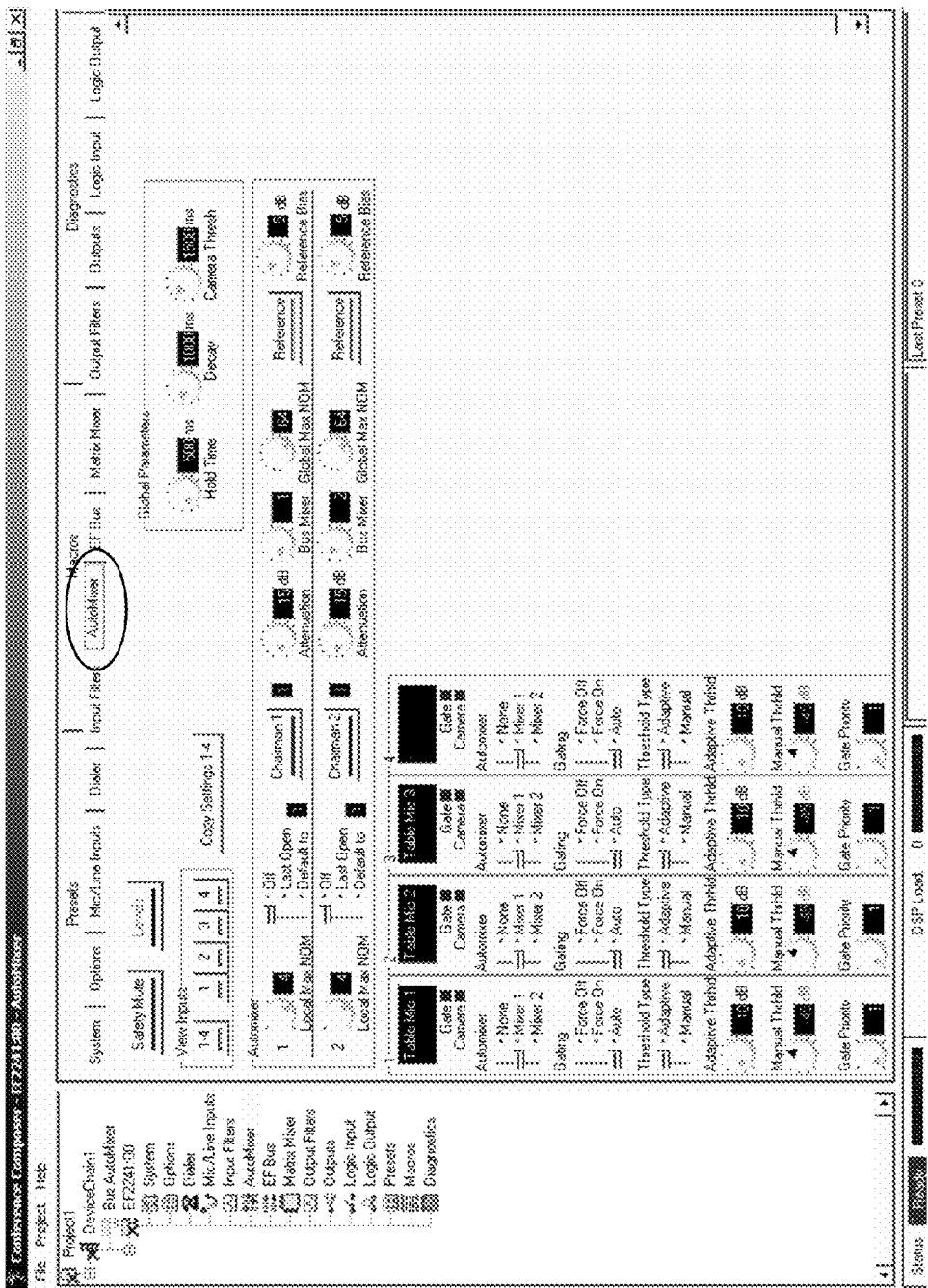
Figure 10E:
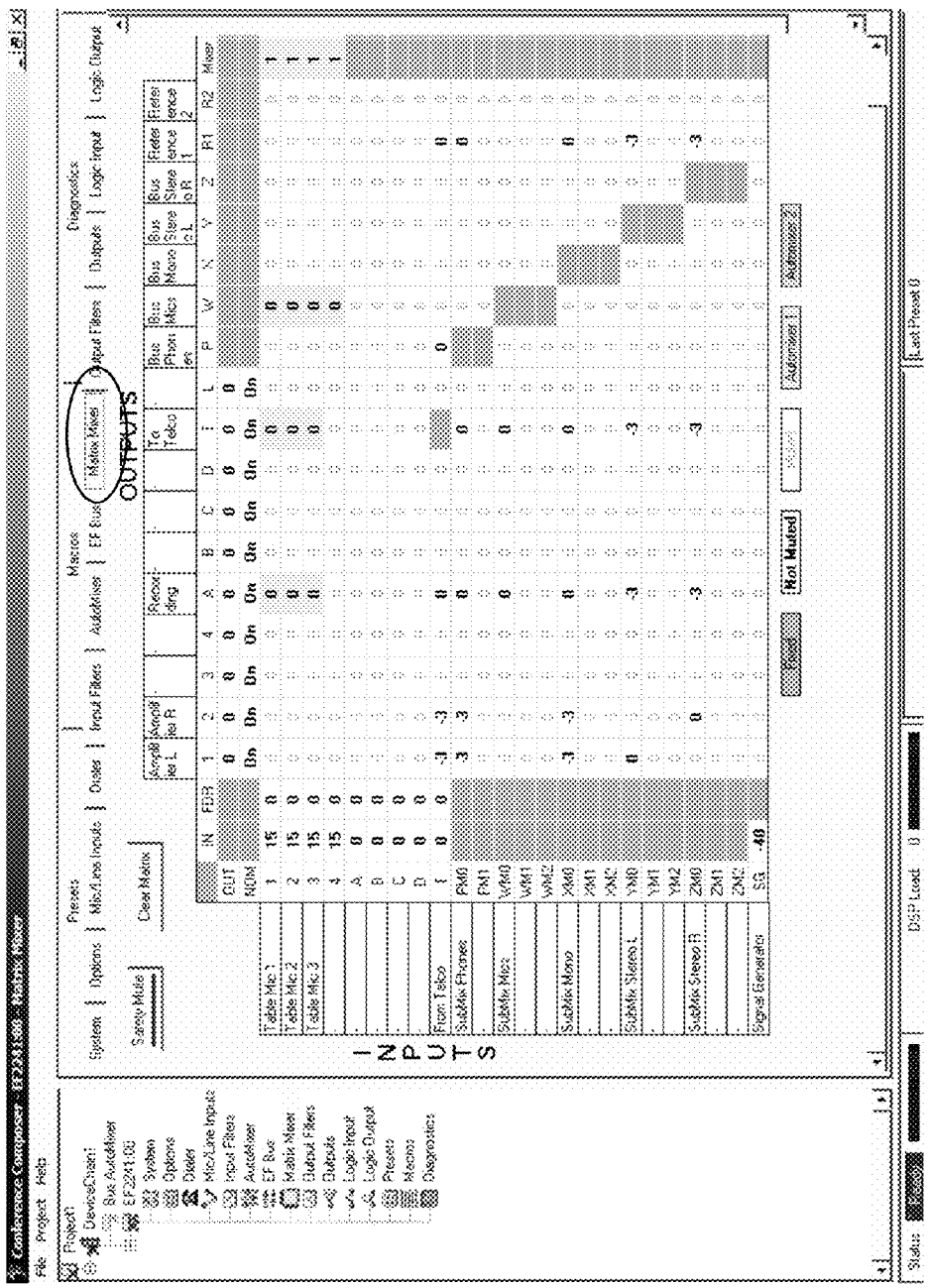
Figure 10F:
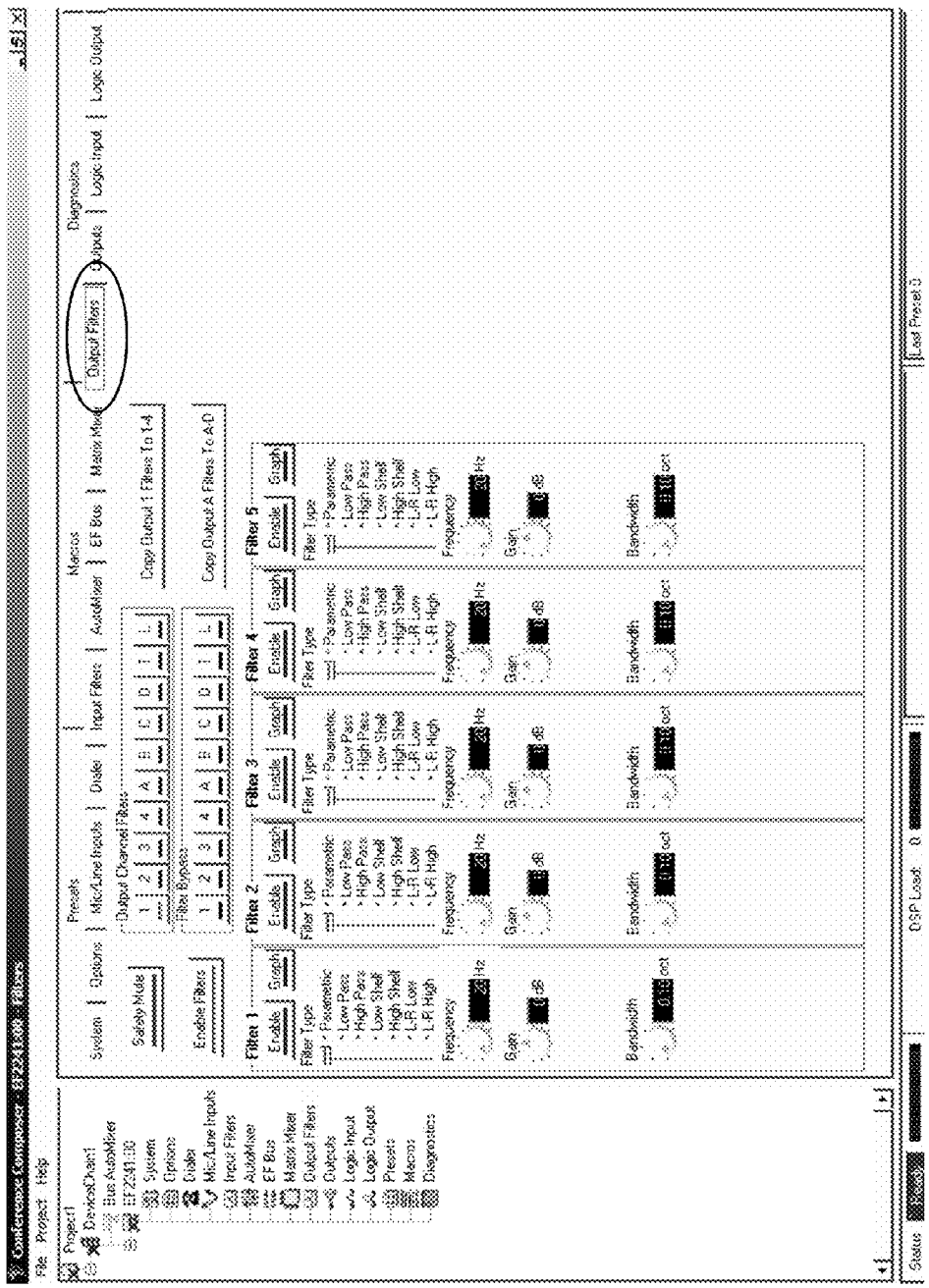
Figure 10G:
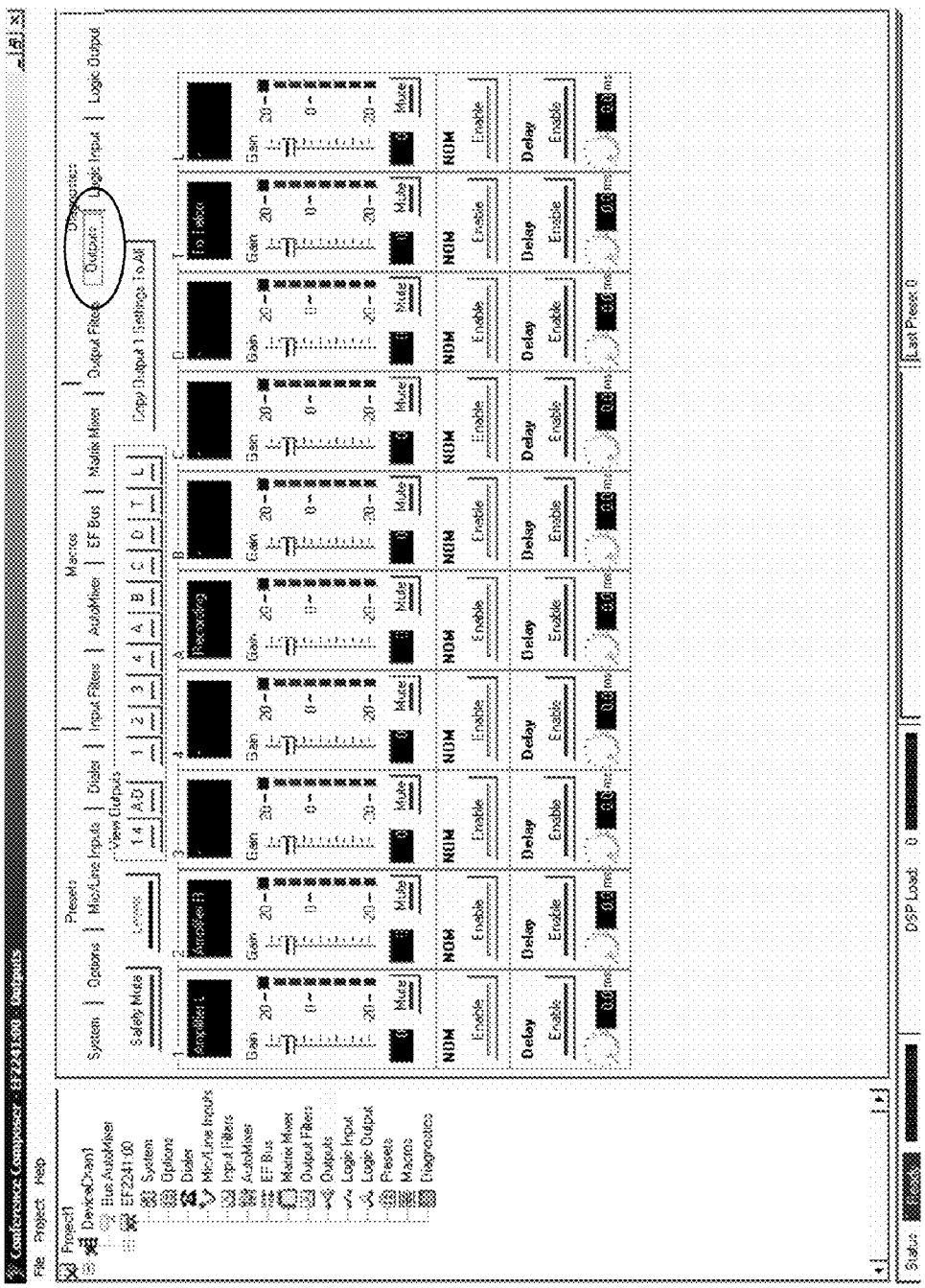

If the administrator desired, manual mapping can be performed via selection 94 in FIG. 8B, and this could be chosen after automatic mapping 92 to allow the administrator to modify the map. If this option is chosen, the administrator associates the presently disconnected inputs (window 96) and outputs (window 97) with the various input and output ports listed for the device in the mapping window 95. This is accomplished by highlighting (i.e., clicking on) the desired disconnected input or output, highlighting the desired input or output port on the device, and pressing the connect button 99. For example, in FIG. 8C, we see that the input table microphone 1 is highlighted, as is microphone input port 2. Once a compatible input and input port pair is chosen, the connect button becomes activated, and pressing it will map the connection. This mapped connection is shown in FIG. 8D, and shows that "table mic 1" has been moved from the microphone input window 96 to the mapping window 95 at microphone input port 2. Because the wizard understands which input/input port pairs (and output/output port pairs) are compatible, it will not allow the administrator to manually associate incompatible members of the pair, which prohibition is accomplished by not activating the connect button 99. Disconnection of inputs/outputs from their ports essentially works in reverse, and with the assistance of the disconnect button 100 (for disconnecting a highlighted input or output from the map) or the disconnect all button 101 (for disconnecting all input and outputs from the map).

After automatic or manual mapping, the administrator proceeds to the next (fifth) and final screen in the wizard by pressing next button 98. This fifth wizard screen in shown in FIG. 9, and shows a design summary window 104, which provides another simplified representation of the input/output map for the device. This summary can be saved on the computer 28 as a text file by pressing the export summary button 106, where it can thereafter be printed and used by the administrator as an easy reference for physically connecting the inputs and outputs to the correct ports on the audio conferencing device. As the final step in the wizard, the administrator presses finish button 108.

At this point, the mapping and optimization parameters (e.g., gain values) are calculated by the wizard. For example, the wizard, having knowledge of the acoustic properties of the inputs and outputs (that left and right output channels need a 3 dB attenuation, that telephone inputs may require special filtering, that certain selected output speakers may need a low-frequency boost, etc.) calculates optimization parameters accordingly. In other optimization or mapping examples, appropriate input and output gains can be set, wireless microphones can be automatically mapped to sound reinforcement outputs; stereo audio is only mapped to stereo amplifiers if both stereo and mono amplifiers are present; mono audio is only mapped to mono amplifiers if both stereo and mono amplifiers are present; inter-device bussing is accomplished if appropriate; input and output labels are set; presets containing all devices setting are stored and set as the "power on" preset"; macros for volume control and muting inputs or outputs are generated; etc. These mapping and optimization parameters, amounting essentially to the data otherwise present in a *.ccp file, are then transferred by the wizard program to the user interface software, such as the Conference Composer software discussed earlier, which has been active in the background but waiting for the wizard to finish.

Once the parameters are loaded into the user interface software as default values, the user interface software is presented to the user where these default values can be viewed, and if necessary, manipulated. For example, the default values resulting from our example above (involving the three microphones, the one telephone, the one stereo amplifier, the one recording device, and the EF2241 audio conference device) are shown in FIGS. 10A-10G, which represent selected screens of interest from the Conference Composer software. As noted earlier, a review of the complexity and options provided to the audio system administrator by these user interface screens underscore the important convenience and time savings that the disclosed wizard program provides, and can transform initialization of the user interface software into an exercise taking minutes rather than hours.

Although it is contemplated to be especially convenient to allow for the manual selection of the input and output devices from the wizard program, it should be noted that such devices may be imported into the wizard program from a file. For example, one might create a computer file for each room in which an audio conferencing system might be used (e.g., "medium-sized conference room," "auditorium," "classroom," etc.) which specifies the inputs and outputs present or placeable in that room. This file could then be imported into the wizard so that inputs and outputs need not be manually selected. This should be understood as a form of "selection" of the inputs and outputs. The same may also be said for the audio conferencing device itself.

Of course, the wizard could potentially initialize the audio conferencing device without the need for intervening user interface software. Thus, the wizard program could send the mapping and optimization parameters directly to the controller in the audio conferencing device, much as the user interface software does. Thus, the data transferred from the wizard program need not make an intervening "stop" at the user interface software and can be used to directly initialize the audio conferencing device even when the user interface is absent, or when it is unnecessary to access or modify such data.

The use of the words "first," "second," etc. and the use of letters "a," "b," etc. in the claims do not necessary imply order, but are rather intended to distinguish various claimed features or steps from one another.

Although shown as separate devices, computer 28 (for running the user interface software and/or the set up program) and audio controller 26 and/or audio conferencing device 10*a* could be combined together into one device. Hence, these components as claimed should not be construed as necessarily separate components unless the context of the claims suggests otherwise.

The foregoing description of preferred and other embodiments are not intended to limit or restrict the scope or applicability of the inventive concepts contained herein. It is intended that the inventive concepts contained herein include all modifications and alterations to the full extent that they come within the scope of the following claims or equivalents thereof.

What is claimed is:

1. A method for choosing an optimal audio conferencing device, comprising:
    receiving, in a set up program executed on a computer, an indication of user selection of at least one audio input;
    receiving, in the set up program, an indication of user selection of at least one audio output;
    automatically selecting, via the set up program, at least one audio conferencing device, wherein the at least one audio conferencing device is automatically selected to be compatible with the indicated selection of inputs and outputs, and to be optimal in conjunction with a selected user preference; and
    sending at least a portion of selected inputs, outputs, and audio conferencing devices as mapping parameters to user interface software, the user interface software controlling one or more conferencing devices, the one or more conferencing devices comprising audio capability.

2. The method of claim 1, further comprising:
    receiving, in the set up program, an indication of user selection of at least one user preference.

3. The method of claim 2, wherein the indication of user selection of at least one user preference reflects a user accepting a default selection.

4. The method of claim 1, wherein the at least one audio input includes at least one device selected from the group consisting of a microphone and a telephone.

5. The method of claim 1, wherein the at least one audio output includes at least one device selected from the group consisting of a speaker, a telephone, and a recorder.

6. The method of claim 1, wherein the user preference is selected from the group consisting of cost and size.

7. A non-transitory computer readable media having computer readable instructions for choosing an optimal audio conferencing device, the computer readable instructions to configure a processor to:
    receive, in a set up program executed on a computer, an indication of user selection of at least one audio input;
    receive, in the set up program, an indication of user selection of at least one audio output;
    automatically select, via the set up program, at least one audio conferencing device, wherein the at least one audio conferencing device is automatically selected to be compatible with the indicated selection of inputs and outputs, and to be optimal in conjunction with a selected user preference; and
    send at least a portion of selected inputs, outputs, and audio conferencing devices as mapping parameters to user interface software, the user interface software controlling one or more conferencing devices, the one or more conferencing devices comprising audio capability.

8. The computer readable medium of claim 7, further comprising:
    computer readable instructions to configure a processor to receive, in the set up program, an indication of user selection of at least one user preference.

9. The computer readable medium of claim 8, wherein the indication of user selection of at least one user preference reflects a user accepting a default selection.

10. The computer readable media of claim 7, wherein the at least one audio input includes at least one device selected from the group consisting of a microphone and a telephone.

11. The computer readable media of claim 7, wherein the at least one audio output includes at least one device selected from the group consisting of a speaker, a telephone, and a recorder.

12. The computer readable media of claim 7, wherein the user preference is selected from the group consisting of cost and size.

13. An audio conferencing configuration system, comprising:
    a processor communicatively coupled to a computer, the computer coupled to an audio conferencing device, wherein the computer contains user interface software for controlling the audio conferencing device;
    a setup program, executing on the processor, for initializing the user interface software wherein the setup program is configured to:
        receive an indication of user selection of at least one audio input;
        receive an indication of user selection of at least one audio output;
        automatically select at least one audio conferencing device, wherein the at least one audio conferencing device is automatically selected to be compatible with the indicated selection of inputs and outputs, and to be optimal in conjunction with a selected user preference; and
        send at least a portion of selected inputs, outputs, and audio conferencing devices as mapping parameters to the user interface software.

14. The audio conferencing configuration system of claim 13, wherein the setup program is further configured to receive an indication of user selection of at least one user preference.

15. The audio conferencing configuration system of claim 14, wherein the indication of user selection of at least one user preference reflects a user accepting a default selection.

16. The audio conferencing configuration system of claim 13, wherein the at least one audio input includes at least one device selected from the group consisting of a microphone and a telephone.

17. The audio conferencing configuration system of claim 13, wherein the at least one audio output includes at least one device selected from the group consisting of a speaker, a telephone, and a recorder.

18. The audio conferencing configuration system of claim 13, wherein the user preference is selected from the group consisting of cost and size.

19. The audio conferencing configuration system of claim 13 wherein the computer comprises one or more processors and the computer executes both the setup program and the user interface software.

* * * * *